United States Patent
Kouloheris et al.

(10) Patent No.: US 7,170,933 B2
(45) Date of Patent: Jan. 30, 2007

(54) METHOD AND SYSTEM FOR OBJECTIVE QUALITY ASSESSMENT OF IMAGE AND VIDEO STREAMS

(75) Inventors: Jack L. Kouloheris, Ossining, NY (US); Ligang Lu, Somers, NY (US); Zhou Wang, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 10/318,846

(22) Filed: Dec. 13, 2002

(65) Prior Publication Data

US 2004/0114685 A1 Jun. 17, 2004

(51) Int. Cl.
*H04N 7/12* (2006.01)

(52) U.S. Cl. ............ 375/240; 375/240.01; 375/240.02; 375/240.03; 375/240.12

(58) Field of Classification Search ................ 375/240, 375/240.01, 240.02, 240.03, 240.12, 240.16, 375/240.25
See application file for complete search history.

(56) References Cited

U.S. PATENT DOCUMENTS 6,052,415 A * 4/2000 Carr et al. ............. 375/240.12
6,810,083 B1 * 10/2004 Chen et al. ............ 375/240.25

* cited by examiner

*Primary Examiner*—Allen Wong
(74) *Attorney, Agent, or Firm*—Scully, Scott, Murphy & Presser, P.C.; Daniel P. Morris, Esq.

(57) ABSTRACT

A method to predict visual quality of a DCT (discrete cosine transform) based compressed image or video stream without referring to its source. When applied to an MPEG video stream, the method is based on (1) an estimation of quantization errors using MPEG quantization scales and statistics of the inverse quantized DCT coefficients, (2) a blind estimation of the 8×8 and 16×16 blocking effect, and (3) an adaptive combination of the quantization error estimation and the blocking effect estimation using the MPEG motion vector information. The method may be used in many applications, such as network video servers, switches and multiplexers for automatic quality monitoring and control of video services, video encoders, decoders, transcoders, and statistical multiplexers for picture quality optimization.

6 Claims, 2 Drawing Sheets

Quantization Error Estimation

Diagram of No-Reference Video
Stream Quality Measurement

Diagram of No-Reference Image
Stream Quality Measurement

Quantization Error Estimation

METHOD AND SYSTEM FOR OBJECTIVE QUALITY ASSESSMENT OF IMAGE AND VIDEO STREAMS

BACKGROUND OF THE INVENTION

1. Field of the Invention

The present invention relates generally to a method and system for objective quality assessment of DCT (discrete cosine transform) based compressed image or video streams, and more particularly pertains to a method and system for objective quality assessment of compressed images of MPEG (moving picture experts group) video streams without the need for the original or reference video source. The method utilizes only the information embedded in the compressed video stream, which consists a sequence of coded frames, to assess the picture visual quality. The inventive method consists of the steps of quantization error estimation, blocking effect estimation, and adaptive combining of these estimates with the motion information if available for each coded frame.

2. Discussion of the Prior Art

Most objective image and video quality measurement approaches require the original image or video source as a reference, which is often not available in practical network image and video communication applications.

In the past several decades, great efforts have been made to develop objective image and video quality measurement approaches that aim to predict perceived image and video quality automatically. The most widely used method is the peak signal-to-noise ratio (PSNR). Other well known approaches include the Sarnoff just-noticeable-difference (JND) model [J. Lubin, "The use of psychophysical data and models in the analysis of display system performance", in A. B. Watson (ed.), *Digital Images and Human Vision*, pp. 163–178, MIT press, 1993] and the NASA digital video quality (DVQ) model [A. B. Watson, J. Hu, J. F. McGowan III, and J. B. Mulligan, "Design and performance of a digital video quality metric", *Proceedings of SPIE, Human Vision, Visual Processing, and Digital Display IX, San Jose*, 2001]. A novel quality measurement algorithm has also been developed [Z. Wang and L. Lu, "Objective image and video quality assessment," *Technical Report, IBM T J. Watson Research Center*, August 2001] which has demonstrated advantages in better correlating with subjective measurement over other approaches in experiments on the video quality experts group (VQEG) Phase I test data set [VQEG, "Final report from the video quality experts group on the validation of objective models of video quality assessment," http://www.vqeg.org/, March 2000]. These objective quality measurement approaches require the original source sequence as a reference. However, in many practical image and video service applications, especially network image and video communications, the reference source is often not available.

It would be useful to develop single-ended or "blind" video quality measurement algorithms, where access to the reference video sequence is not required.

Little has been done in designing blind video quality assessment methods in the literature. In [M. Knee, "A robust, efficient and accurate single-ended picture quality measure for MPEG-2", presented at VQEG meeting 2001], a single-ended approach was proposed for quality measurement of MPEG-2 video. This method, known as Picture Appraisal Rating (PAR), assumes a distribution of the DCT coefficient and attempts to predict PSNR using an "activity" parameter and the quantization scale parameters, which are available from the MPEG bitstream. The author claimed that their measurement results have a good correlation with PSNR without using the reference video sequence. Software, hardware and embedded system products that implement this method are for sale by the Snell & Wilcox Company (http://www.snellwilcox.com) The PAR approach has several disadvantages:

- It tries to estimate PSNR, which has been widely criticized for not correlating well with perceived video quality. A better benchmarking technique is needed to assess the method and also to improve the method.
- Blocking artifact has proved to be one of the most annoying artifacts in Discrete Cosine Transform (DCT) based image and video coding algorithms. However, it is not considered as a distinct factor in PAR. As a result, PAR cannot properly capture and measure the blocking effect, which is similar to PSNR.
- There is more information than just quantization scales available from the MPEG bitstream, which is not considered by the PAR method. The statistics of the inverse quantized coefficients and the motion information given by the motion vectors would also be useful for the design of no-reference video quality metrics.

SUMMARY OF THE INVENTION

Accordingly, it is a primary object of the present invention to provide a method and system for objective quality assessment of DCT based compressed image and video streams.

The present invention provides a method of automatic measurement of compressed image and video quality without the need for the original or reference image and video source. The method utilizes only the information embedded in the compressed image or video stream, which consists of a sequence of coded frames, to assess the picture visual quality. The inventive method consists of the steps of quantization error estimation, blocking effect estimation, and adaptive combining of these estimates with the motion information if available for each coded frame. The estimation of the quantization errors uses the information of the quantization scales and statistics of the inverse quantized DCT coefficients in that coded frame. The blocking effect is estimated based on the block sizes used in the signal processing for compression, for example, 8×8, 8×16, 16×16, etc. The quantization error estimation and the blocking effect estimation are adaptively combined linearly or non-linearly and using motion information if available.

The present invention provides a new method to predict visual quality of DCT based compressed image and video without referring to its source. The method, when applied to MPEG video, is based on (1) an estimation of quantization errors using MPEG quantization scales and statistics of the inverse quantized DCT coefficients, (2) a blind estimation of the 8×8 and 16×16 blocking effect, and (3) an adaptive combination of the quantization error estimation and the blocking effect estimation using the MPEG motion vector information. The method correlates well with a recently developed full-reference video quality index [Z. Wang and L. Lu, "Objective image and video quality assessment," *Technical Report, IBM T. J. Watson Research Center*, August 2001], which has shown its advantages over many state-of-the-art objective video quality assessment methods. The subject invention may be used in many applications, such as network video servers, switches and multiplexers for automatic quality monitoring and control of video services. It may also be used in video encoders, decoders, transcoders, and statistical multiplexers for picture quality optimization.

BRIEF DESCRIPTION OF THE DRAWINGS

The foregoing objects and advantages of the present invention for a method and system for objective quality assessment of image and video streams may be more readily understood by one skilled in the art with reference being had to the following detailed description of several embodiments thereof, taken in conjunction with the accompanying drawings wherein.

DETAILED DESCRIPTION OF THE INVENTION

Figure 1:
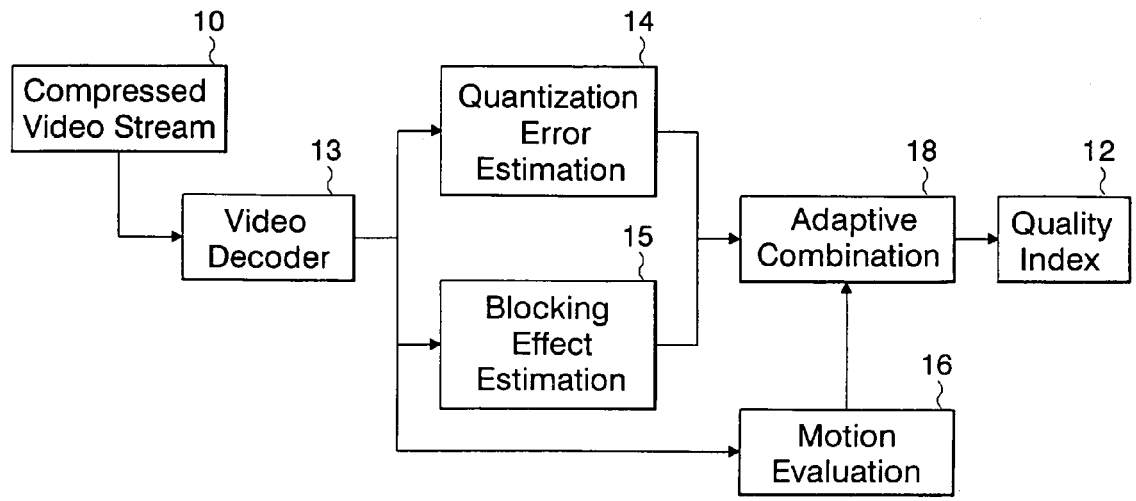
FIG. 1 is a high level block diagram of the method of the present invention for a no-reference quality measurement of a compressed video stream.

FIG. 1 is a high level block diagram of the method of the present invention for a no-reference quality measurement of a compressed video stream, such as an MPEG video stream or other DCT based compressed video streams such as H.261, H.263 and H.264 standard coded video streams. The input to the system is simply a compressed video bitstream 10. No reference sequence is needed. The output quality index value 12 can be evaluated and reported on either a frame basis or a sequence basic, depending on the application.

First, the input compressed video bitstream 10 is partially decoded by a video decoder 13 (such as an MPEG decoder for an MPEG video bitstream) to obtain (1) the inverse quantized DCT coefficients, (2) the quantization scale and (3) the motion vector for each block.

Second, the quantization error (which is the error due to quantization of values, e.g. a 3.2 value on a scale of 0 to 10 is quantized to a 3.0 value) is estimated at 14. If the probability distribution of the DCT coefficients is known, then the quantization error can be exactly calculated using the quantization scales. In MPEG decoding, this distribution is not known and has to be estimated. In [M. Knee, "A robust, efficient and accurate single-ended picture quality measure for MPEG-2", presented at VQEG meeting 2001], the author assumed a fixed form of distribution (e.g. the Laplacian distribution) such that the problem is simplified to estimating one parameter. However, this assumption is not guaranteed to give a precise and reliable approximation of the true distribution. In the present method, histogram statistics are applied to the inverse quantized DCT coefficients, which are available from the video decoder, to obtain a histogram. The histogram is then used to estimate the distribution on a piece-wise basis (which is different from [M. Knee, "A robust, efficient and accurate single-ended picture quality measure for MPEG-2", presented at VQEG meeting 2001]).

For a given DCT coefficient, if the inverse quantized value is L and the quantization scale is q, then the quantization error is estimated as $$E = \frac{\int_{L-q/2}^{L+q/2} |x-L|^2 p(x) dx}{\int_{L-q/2}^{L+q/2} p(x) dx}$$

where p(x) is the estimated probability distribution of the DCT coefficient. The quantization errors of all the DCT coefficients are then averaged together to obtain an estimate of the overall quantization error of the frame.

The blocking effect or block artifact is a form of the noise or distortion introduced in block based DCT coding due to excessive quantization and appears as one or more small blocks in a decoded image or video frame. The blocking effect is one of the most annoying distortions, especially at low bit rate coding using block based DCT coding algorithms and is a very important picture quality factor in MPEG coding. The blocking effect is estimated at 15. The estimation of the blocking effect can be performed in either the spatial domain with a fully decoded frame [Z. Wang, A. C. Bovik, and B. L. Evans, "Blind measurement of blocking artifact in images," *IEEE International Conference on Image Processing*, vol. 3, pp. 981–984, September 2000] or in the DCT domain without full decoding [A. C. Bovik, and S. Liu, "DCT-domain blind measurement of blocking artifacts in DCT-coded images," *IEEE International Conference on Acoustic, Speech, and Signal Processing*, vol. 3, pp. 1725–1728, May 2001]. In a preferred embodiment, the evaluation of the blocking effect is performed in the DCT domain without full decoding. An alternative embodiment can perform evaluation of the blocking effect with a fully decoded frame. However, the alternative approach requires a Fast Fourier Transform (FFT) on the image signal, which is computationally complicated. The present invention uses a simplified method. First, take a row f(n), n=1, 2, . . . from the image, and take the absolute difference of adjacent samples: d(n)=|f(n)−f(n−1)|. A blocky signal d(n) will have periodic peaks. The periodic peaks are detected, and then the relative magnitude between the peaks in d(n) and their adjacent samples of d(n) are used as an estimate of blocking effect. The same process is performed on all or a proportion of all the rows (depending on allowed computation power) and columns. The blockiness values are then averaged to obtain the overall blocking effect measure of the frame.

The human visual sensitivity to errors changes with motion. In MPEG the motion information can be simply evaluated at 16 by using the motion vectors extracted from the MPEG bitstream. In a preferred embodiment, only the magnitude of the motion vectors is calculated and used by the algorithm of the present invention, but could be extended to consider other aspects of the motion vectors.

Finally, the quantization error estimation is adaptively combined with the blocking effect estimation at 18. In the preferred embodiment, only a simple linear combination of these two factors is used and normalized to generate a single overall quality measure or index of the frame at 12, although a more sophisticated combination, such a non-linear combination, can also be used. When available, the motion information is used in some special cases as a sign of adjustment. The reason to use motion information is based upon the fact what when large motion exists, the human eyes become less sensitive to the errors caused by blurring. In MPEG, this usually corresponds to the cases where the blocking effect is small. Therefore, if the frame exhibits severe quantization error but its blocking effect is small, and at the same time the motion is large, then the measure is adjusted to obtain a better quality index value at 12.

The method described above is for the evaluation of a single MPEG frame. The frame quality values can also be averaged to provide a quality measurement of a group of frames or pictures or even an entire video sequence.

Figure 2:
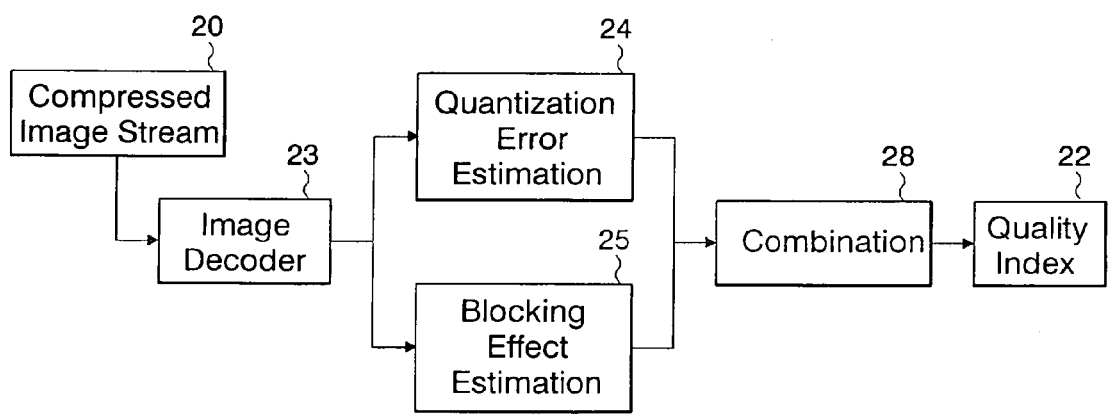
FIG. 2 is a high level block diagram of the method of the present invention for a no-reference quality measurement of a compressed image stream.

FIG. 2 is a high level block diagram of the method of the present invention for a no-reference quality measurement of a compressed image stream 20 such as a JPEG coded image stream. The input to the system is simply a compressed image bitstream 20. No reference sequence is needed.

First, the input compressed image bitstream 20 is partially decoded by an image decoder 23 to obtain (1) the inverse quantized DCT coefficients, (2) the quantization scale and (3) motion vectors for each frame, if available.

Second, the quantization error is estimated at 24. If the probability distribution of the DCT coefficients is known, then the quantization error can be exactly calculated using the quantization scales. In JPEG decoding, this distribution is not known and has to be estimated, similar to 14 of FIG. 1.

The blocking effects is evaluated at 25, similar to 15 of FIG. 1.

Finally, the quantization error estimation is combined with the blocking effect estimation at 28. This is not an adaptive combination as in FIG. 1 as motion evaluation is not a factor in a compressed image stream. In the preferred embodiment, only a simple linear combination of these two factors is used and normalized to generate a single overall quality measure or index of the frame at 22, although a more sophisticated combination, such as a non-linear combination, can also be used.

Figure 3:
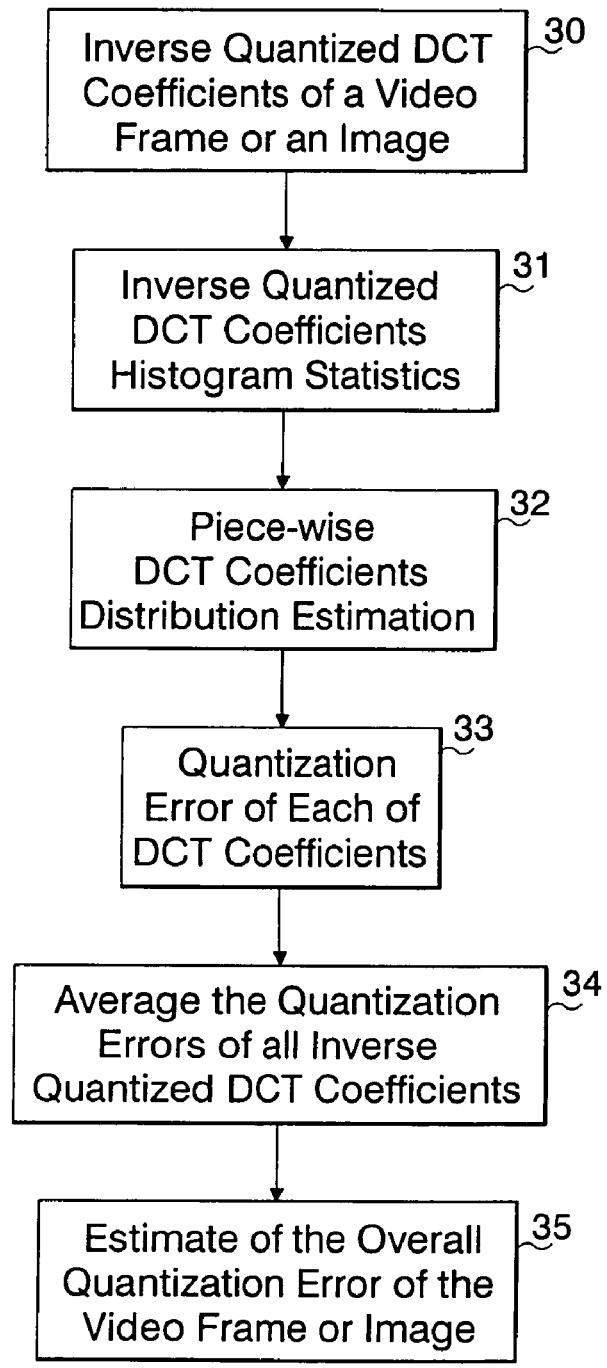
FIG. 3 is a logic flow diagram of the quantization error estimation pursuant to the present invention.

FIG. 3 is a logic flow diagram of the quantization error estimation at 14 or 24. First obtain the inverse quantized DCT coefficients of a video frame or an image frame at 30. Next use the inverse quantized DCT coefficients to generate histogram statistics at 31. The histogram statistics are then used to estimate the distribution of the DCT coefficients on a piece-wise basis at 32. Next, obtain the quantization error of each of the DCT coefficients at 33, and average the quantization errors of all inverse quantized DCT coefficients at 34, which are then used to estimate the overall quantization error of the video frame or image frame at 35.

While several embodiments and variations of the present invention for a method and system for objective quality assessment of video streams are described in detail herein, it should be apparent that the disclosure and teachings of the present invention will suggest many alternative designs to those skilled in the art.

The invention claimed is:

1. A method for measuring the video quality of a coded frame of a compressed video stream without access to an original or reference video source and while utilizing only the information embedded in the compressed video stream, comprising:

estimating quantization errors of the coded frame of the compressed video stream;

estimating blocking effects of the coded frame of the compressed video stream; and measuring the video quality of the coded frame of the compressed video stream by adaptively combining the estimate of quantization errors with the estimate of blocking effects and with motion information on the coded frame of the compressed video stream; wherein:

the compressed video stream comprises an MPEG video stream consisting of a sequence of coded frames;

an input MPEG video bitstream is partially decoded by an MPEG decoder to obtain (1) inverse quantized DCT coefficients, (2) quantization scale and (3) motion vectors for each frame; and the step of estimating quantization errors includes the step of estimating a probability distribution of the inverse quantized DCT coefficients by applying histogram statistics to the inverse quantized DCT coefficients to derive a histogram, which is then used to estimate a distribution on a piece-wise basis.

2. A method for measuring the video quality of a coded frame of a compressed video stream without access to an original or reference video source and while utilizing only the information embedded in the compressed video stream, comprising:

estimating quantization errors of the coded frame of the video stream;

estimating blocking effects of the coded frame of the video stream;

measuring the video quality of the coded frame of the video stream by adaptively combining the estimate of quantization errors with the estimate of blocking effects and with motion information on the coded frame of the compressed video stream, wherein the compressed video stream comprises an MPEG video stream consisting of a sequence of coded frames;

said MPEG video stream is partially decoded by an MPEG decoder to obtain (1) inverse quantized DCT coefficients, (2) quantization scale and (3) motion vectors for each frame;

and a probability distribution of inverse quantized DCT coefficients is estimated by applying histogram statistics to inverse quantized DCT coefficients, which are obtained from the MPEG decoder, to derive a histogram which is then used to estimate a distribution on a piece-wise basis, wherein for a given DOT coefficient, if the inverse quantized value L and the quantization scale is q, then the quantization error is estimated as $$E = \frac{\int_{L-q/2}^{L+q/2} |x - L|^2 p(x) dx}{\int_{L-q/2}^{L+q/2} p(x) dx}$$

where p(x) is the estimated probability distribution of the DCT coefficient, and the quantization errors of all the inverse quantized coefficients are then averaged together to obtain an estimate of the overall quantization error of the frame.

3. The method for measuring the video quality of a coded frame of a compressed video stream without access to an original or reference video source and while utilizing only the information embedded in the compressed video stream, comprising:

estimating quantization errors of the coded frame of the compressed video stream;

estimating blocking effects of the coded frame of the compressed video stream; and measuring the video quality of the coded frame of the compressed video stream by adaptively combining the estimate of quantization errors with the estimate of blocking effects and with motion information on the coded frame of the compressed video stream;

wherein in estimating blocking effects, for a row f(n), n=1, 2, . . . from the image, take the absolute difference of adjacent samples, d(n)=|f(n)−f(n−1)|, wherein a blocky signal d(n) has periodic peaks, detect the periodic peaks and use the relative magnitude between the peaks in d(n) and their adjacent samples of d(n) as an estimate of the blocking effects, performed on all or a proportion of all the rows and columns, and average the blockiness values to obtain an overall blocking effect measure of the frame.

4. The method for measuring the quality of a coded frame of a compressed image stream without access to an orignal or reference image source and while utilizing only the information embedded in the compressed image stream, comprising:

estimating quantization errors of the coded frame of the compressed image stream; estimating blocking effects of the coded frame of the compressed image stream; and measuring the video quality of the coded frame of the compressed image stream by combining the estimate of quantization errors with the estimate of blocking effects;

wherein:

the compressed image stream comprises a JPEG coded image stream; and the step of estimating the quantization errors uses JPEG quantization scales and statistics of inverse quantized DCT coefficients, including the step of estimating a probability distribution of the inverse quantized DCT coefficients by applying histogram statistics to the inverse quantized DCT coefficients to derive a histogram, which is then used to estimate a distribution on a price-wise basis.

5. A method for measuring the quality of a coded frame of a compressed image stream without access to an original or reference image source and while utilizing only the information embedded in the compressed image stream, comprising:

estimating quantization errors of the coded frame of the image stream;

estimating blocking effects of the coded frame of the image stream; and measuring the video quality of the coded frame of the image stream by combining the estimate of quantization errors with the estimate of blocking effects; wherein the compressed image stream comprises a JPEG coded image stream;

the step of estimating the quantization errors uses JPEG quantization scales and statistics of inverse quantized DCT coefficients; and a probability distribution of inverse quantized DCT coefficients is estimated by applying histogram statistics to inverse quantized DCT coefficients, to derive a histogram which is then used to estimate a distribution on a piece-wise basis, wherein for a given DCT coefficient, if the inverse quantized value L and the quantization scale is q, then the quantization error is estimated as $$E = \frac{\int_{L-q/2}^{L+q/2} |x-L|^2 p(x)dx}{\int_{L-q/2}^{L+q/2} p(x)dx}$$

where p(x) is the estimated probability distribution of the DCT coefficient, and the quantization errors of all the inverse quantized coefficients are then averaged together to obtain an estimate of the overall quantization error of the frame.

6. The method of claim 5, wherein in estimating blocking effects, for a row f(n), n=1,2, . . . from the image, take the absolute difference of adjacent samples, d(n)=|f(n)−f(n−1)|, wherein a blocky signal d(n) has periodic peaks, detect the periodic peaks and use the relative magnitude between the peaks in d(n) and their adjacent samples of d(n) as an estimate of the blocking effects, performed on all or a proportion of all the rows and columns, and average the blockiness values to obtain an overall blocking effect measure of the frame.

* * * * *